(12) United States Patent
Hamre et al.

(10) Patent No.: US 8,547,426 B2
(45) Date of Patent: Oct. 1, 2013

(54) LOW SETTLE TIME MICRO-SCANNING SYSTEM

(75) Inventors: John D. Hamre, North Plymouth, MN (US); Daniel F. Maase, North Plymouth, MN (US)

(73) Assignee: Identix Incorporated, Bloomington, MN (US)

( * ) Notice: Subject to any disclaimer, the term of this patent is extended or adjusted under 35 U.S.C. 154(b) by 451 days.

(21) Appl. No.: 12/814,655

(22) Filed: Jun. 14, 2010

(65) Prior Publication Data

US 2010/0315499 A1 Dec. 16, 2010

Related U.S. Application Data

(60) Provisional application No. 61/268,896, filed on Jun. 15, 2009.

(51) Int. Cl.
*H04N 9/47* (2006.01)
*H04N 7/18* (2006.01)

(52) U.S. Cl.
USPC ............ 348/77; 340/5.82; 340/5.83; 382/124

(58) Field of Classification Search
USPC .......................................... 348/77; 382/124
See application file for complete search history.

(56) References Cited

U.S. PATENT DOCUMENTS

| | | | |
|---|---|---|---|
| 4,947,260 A | 8/1990 | Reed et al. | |
| 5,647,364 A * | 7/1997 | Schneider et al. | 600/445 |
| 6,005,682 A | 12/1999 | Wu et al. | |
| 6,016,702 A | 1/2000 | Maron | |
| 6,219,794 B1 | 4/2001 | Soutar et al. | |
| 6,894,873 B2 | 5/2005 | Kasajima et al. | |
| 7,498,564 B2 | 3/2009 | Miles et al. | |
| 2002/0133725 A1 | 9/2002 | Roy et al. | |
| 2006/0204061 A1 | 9/2006 | Mainguet | |
| 2008/0004839 A1 | 1/2008 | Papadimitriou et al. | |
| 2008/0123908 A1 | 5/2008 | Waldman et al. | |
| 2009/0067976 A1* | 3/2009 | Xu | 414/757 |
| 2009/0226050 A1* | 9/2009 | Hughes | 382/124 |

OTHER PUBLICATIONS

"Designing with Piezoelectric Transducers: Nanopositioning Fundamentals", Physik Instrumente (PI) GmbH & Co., Sep. 2005, 4-1 through 4-49.
International Search Report and Written Opinion for PCT/US2010/038676, mailed Sep. 7, 2010.

* cited by examiner

Primary Examiner — Joseph Ustaris
Assistant Examiner — Anner Holder
(74) Attorney, Agent, or Firm — Fish & Richardson P.C.

(57) ABSTRACT

Systems, apparatus, and methods for providing a micro-scanning system with low settle times for fingerprint image capture are provided. In one embodiment, a flexure apparatus includes a stiffening device and parallelogram structures. The flexure apparatus is configured to move an image sensor to different positions to capture images that can be used to form a composite image according to micro-scanning techniques. The stiffening device allows the resonant frequency of the flexure apparatus to be established at a higher level than the operation frequency of the flexure apparatus, minimizing the settle time required for the flexure apparatus.

26 Claims, 6 Drawing Sheets

LOW SETTLE TIME MICRO-SCANNING SYSTEM

CROSS-REFERENCE TO RELATED APPLICATION

This application claims benefit under 35 U.S.C. 119(e) to Provisional Application No. 61/268,896, filed Jun. 15, 2009, and entitled "LOW SETTLE TIME MICRO-SCANNING SYSTEM." This application is incorporated by reference herein in its entirety.

BACKGROUND

The traditional method of obtaining a fingerprint image is to first apply ink to a subject's finger, and then to transfer the fingerprint pattern of ridges and valleys to a piece of paper by pressing the finger to the paper. The fingerprint pattern of ridges transfers to the paper, while the valleys do not. To obtain a rolled fingerprint image, a side of an inked finger is placed in a designated area of the paper and then the finger is rolled to its other side on the paper.

Opto-electronic systems can capture a rolled fingerprint image without the use of ink. Typically, a series of optical images of a rolling finger on an imaging surface are propagated from an image sensor and converted to digital data. A variety of methods can be used to generate a rolled fingerprint image from the digital data representative of the series of images.

The drive toward increased optical resolution is seen across the fingerprint imaging industry. The increase in image sensor resolution in recent years clearly indicates this industry trend.

SUMMARY

Disclosed herein are systems, flexure apparatus, and methods for use within micro-scanning techniques.

In one embodiment, an apparatus configured to micro-scan a fingerprint image includes an image sensor configured to capture fingerprint images, a first actuator, a second actuator, and an assembly. The assembly includes a mounting point configured to hold the image sensor, a first mounting region configured to hold the first actuator, a second mounting region configured to hold the second actuator, and a stiffening device. The first actuator is configured to produce a linear translation of the mounting point. The second actuator is configured to produce a linear translation of the mounting point, the linear translation produced by the second actuator being substantially orthogonal to the linear translation produced by the first actuator. The stiffening device is coupled to the mounting point, the first actuator, and the second actuator. The stiffening device has a geometry configured to establish the resistance of the mounting point to a force induced by the first actuator configured to produce a linear translation of the mounting point and to establish the resistance of the mounting point to a force induced by the second actuator configured to produce a linear translation of the mounting point.

In one embodiment, a system configured to micro-scan a fingerprint image includes an image sensor configured to capture fingerprint images, a first actuator, a second actuator, an assembly, and a control unit configured to drive the first actuator and the second actuator with a drive signal. The assembly includes a mounting point configured to hold the image sensor, a first mounting region configured to hold the first actuator, a second mounting region configured to hold the second actuator, a stiffening device, and a plurality of parallelogram structures. The stiffening device is coupled to the mounting point, the first actuator, and the second actuator. The plurality of parallelogram structures are configured to define a first linear translation of the mounting point due to a force induced by the first actuator and a second linear translation of the mounting point due to a force induced by the second actuator. The first linear translation is substantially orthogonal to the second linear translation. The plurality of parallelogram structures also substantially prevent rotation of the mounting point in the plane of the assembly.

In one embodiment, a method of generating a fingerprint image includes collecting light from a finger with an image sensor at a first position to capture a first image. The image sensor is then translated from the first position to a second position. The translation from the first position to the second position is substantially along a first diagonal of a substantially rectangular set of four vertices. Light is collected from the finger with the image sensor at the second position to capture a second image, the second image being captured within less than about 20 milliseconds of capturing the first image. The image sensor is then translated from the second position to a third position. The translation from the second position to the third position is substantially along a first side of the substantially rectangular set of four vertices. Light is collected from the finger with the image sensor at the third position to capture a third image, the third image being captured within less than about 20 milliseconds of capturing the second image. The image sensor is then translated from the third position to a fourth position. The translation from the third position to the fourth position is substantially along a second diagonal of the substantially rectangular set of four vertices. Light is collected from the finger with the image sensor at the forth position to capture a fourth image, the fourth image being captured within less than about 20 milliseconds of capturing the third image. The first, second, third, and fourth images may then be combined in a composite image, the composite image having a higher resolution than a resolution of the first, second, third, and fourth images.

In one embodiment, a method of generating a fingerprint image includes collecting light from a finger with an image sensor at a first position to capture a first image. The image sensor is then translated from the first position to a second position. Light is collected from the finger with the image sensor at the second position to capture a second image, the second image being captured within less than about 20 milliseconds of capturing the first image. The image sensor is then translated from the second position to a third position. The translation from the second position to the third position is substantially orthogonal to the translation from the first position to the second position. Light is collected from the finger with the image sensor at the third position to capture a third image, the third image being captured within less than about 20 milliseconds of capturing the second image. The image sensor is then translated from the third position to a fourth position. The translation from the third position to the fourth position is substantially parallel to the translation from the first position to the second position. Light is collected from the finger with the image sensor at the forth position to capture a fourth image, the fourth image being captured within less than about 20 milliseconds of capturing the third image. The first, second, third, and fourth images may then be combined in a composite image, the composite image having a higher resolution than a resolution of the first, second, third, and fourth images.

In one embodiment, a method of generating a rolled fingerprint image includes: a) collecting light from a rolling finger with an image sensor at one position to capture an image; b) translating the image sensor to a new position; and, c) collecting light from the rolling finger with the image sensor at the new position to capture another image. Steps b) and c) are repeated, wherein a current new position after each repetition of steps b) and c) is located a distance from a previous new position that is a fraction of the pixel to pixel spacing of the image sensor. Steps b) and c) are repeated to capture a plurality of images that may be combined in a composite image having a higher resolution than a resolution of each of the images of the plurality of images.

The details of one or more embodiments are set forth in the accompanying drawings and the description below. Other features, objects, and advantages will be apparent from the description and drawings, and from the claims.

DETAILED DESCRIPTION

Figure 1:
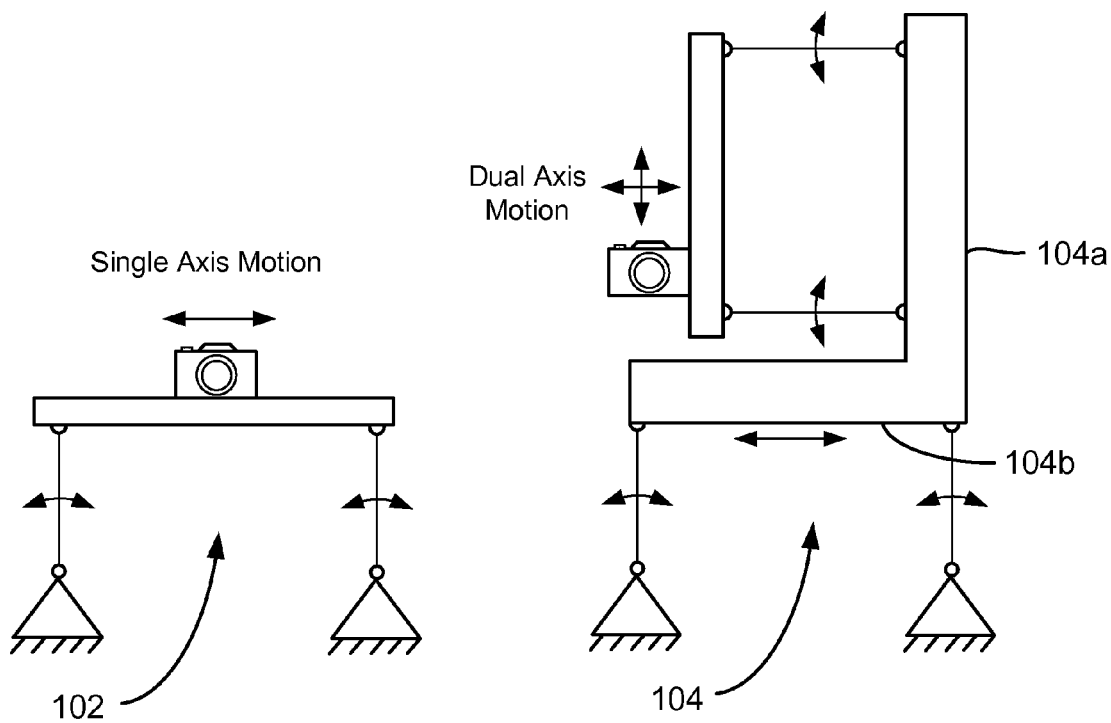
FIG. 1 schematically illustrates two parallelogram structures.

The invention relates to electronic fingerprint image capture systems, flexure apparatus, and methods, and, in particular, to micro-scanning systems and methods for capturing rolled fingerprint images in a high resolution digital image. The micro-scanning systems, flexure apparatus, and methods, however, may also be used to capture slap fingerprint images, fore-fingerprint images, and palm print images, or be implemented in other fields, including microscopy.

Increasing the image sensor resolution is a direct way of increasing optical resolution. A technique called micro-scanning can also be used to enhance optical resolution. Micro-scanning consists of capturing multiple images of a stationary scene or a relatively stationary scene from multiple vantage points with a conventional digital imaging system. The different vantage points are separated by a very small distance, typically a fraction of the pixel spacing of the image sensor. The multiple images can be combined into a composite image with a resolution greater than that of that of the native image sensor resolution. In order to move the image sensor to the various vantage points required for micro-scanning, a mechanical system (i.e., a flexure apparatus) consisting of an assembly (also referred to as flexure) and piezoelectric actuators may be employed. The imaging circuitry, including an image sensor, is attached to the assembly; the assembly may be a part of a metal piece which is fixed relative to the object being imaged. The actuators are placed in the flexure apparatus in such a way so as to displace the image sensor in a desired manner.

As noted above, in order to achieve a high resolution digital image using micro-scanning techniques, digital images are combined to form a composite image. In order to form composite images fast enough to support real-time images, such as rolled fingerprint images, the composite image rate must be about 12 images per second or higher. When a micro-scanning approach employing four images taken from four different vantage points are combined to create each composite image, the image acquisition rate must be about 48 images per second, as given by: 12 composite images/second×4 images/composite image=48 images/second. A flexure apparatus is used in micro-scanning systems to move an image sensor to different positions to capture the images needed to generate a composite image. For example, if an image sensor has a resolution of about 500 pixels per inch (ppi), four images taken with the image sensor according to micro-scanning techniques may be combined to generate a composite image with a resolution of about 1000 ppi.

There are two things that occur within the time period of each image acquisition. The first is movement of the image sensor, which is a very small movement in micro-scanning techniques. The second is the acquisition of the image, which includes both image acquisition and image data transmission. The time allotted for the capture of each image is the inverse of the image acquisition rate, which in this case is 20.83 milliseconds (i.e., 1 second/48 images). Image acquisition and image data transfer may consume a large portion of this time, leaving just about 3 to 10 milliseconds for the image sensor to move and settle.

As noted, the image acquisition rate is rapid for real-time images, and the image sensor must be moved to different positions quickly. While the distance the image sensor is translated to a different position is small (typically a fraction of the pixel spacing of the image sensor, about 1 to 5 micrometers in some instances, or about 3 micrometers in other instances) the translation time is not the only time that must be accounted for when moving the image sensor. Time must also be taken to ensure that the image sensor is not vibrating after it reaches a position in which an image is to be taken. In order to assure that the image sensor settles (i.e., is not vibrating) in the required amount of time, it is important to either dampen resonant behavior of the flexure apparatus with some form of damping, active or otherwise, or to avoid exciting resonances altogether. Damping resonant behavior requires the use of additional circuitry or additional material, which in turn implies additional cost and/or complexity.

One design approach for a flexure apparatus is to design the apparatus such that resonances are as high in frequency as possible, and then to avoid exciting resonances by limiting the frequency content of the waveform that is used to drive the actuators (i.e., the actuator drive signals). A design implementing such an approach may be configured as an open-loop system because active damping may not be necessary. This avoids additional circuitry, including feedback sensors such as capacitive sensors or strain gauges, associated with closed-loop designs in which active damping is employed.

In order to understand how an flexure apparatus can be designed to maximize the device resonances, it is instructive to consider the equation relating system resonant frequencies with other system parameters. The governing equation for system resonance is:

$$\text{frequency of resonance} = \frac{1}{2\pi}\sqrt{\frac{K}{M}} \quad \text{(Equation 1)}$$

K is the stiffness of the system and M is the mass of the system. So, in order to maximize the frequency at which the system resonates, the goal is to reduce the mass and increase the stiffness of the system.

A commonly used geometrical structure for flexure apparatus in micro-scanning systems is the parallelogram. Two parallelogram structures are schematically illustrated in FIG. 1. A parallelogram structure is torsionally very stiff which keeps the image sensor from rotating (i.e., rotation clockwise or counter-clockwise in the plane of the sheet of paper on which the parallelogram structures are depicted) while providing for translation in the desired direction. If an image sensor is allowed to rotate, the individual images cannot be combined to produce a composite image. A single parallelogram structure 102 provides one degree of motion (horizontal motion, in this case). In a compound parallelogram structure 104, a second parallelogram structure 104a may be built off of a first parallelogram structure 104b to provide a second degree of motion (horizontal motion and vertical motion, in this case).

In flexure apparatus for micro-scanning such as the parallelogram structures shown in FIG. 1, mass and stiffness of such apparatus are substantially interdependent. This is because the stiffness of the system is incorporated into the parallelogram legs. If the stiffness of the system is increased by increasing the thickness of the parallelogram legs, the mass of the system is increased as well. This constrains the performance of the flexure apparatus because the mechanical resonances, which determine settling times of the image sensor, are set by the stiffness and mass of the system.

Embodiments of a flexure apparatus of the present invention address the above-noted challenges and issues. The flexure apparatus of the present invention includes parallelogram structures and a stiffening device which independently adjusts the stiffness of the apparatus. The additional degree of freedom (i.e., adjusting the stiffness of the apparatus) provided by the stiffening device separates the problem of designing the parallelogram structures for their respective stress limits and sizing the stiffening device so that it can provide the stiffness necessary to achieve desired system resonant frequency goals.

Apparatus

Figure 2A:
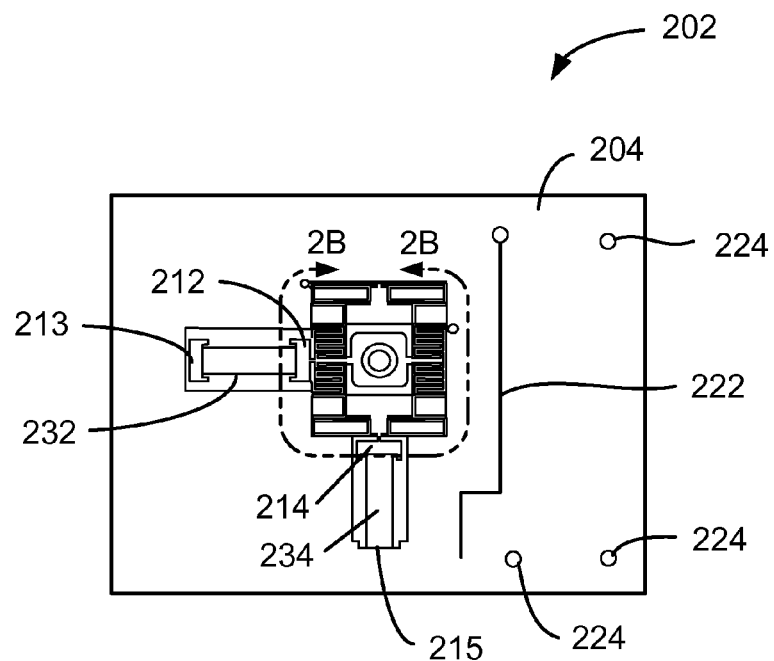
FIG. 2A schematically illustrates a flexure apparatus according to one embodiment of the present invention.
Figure 2B:
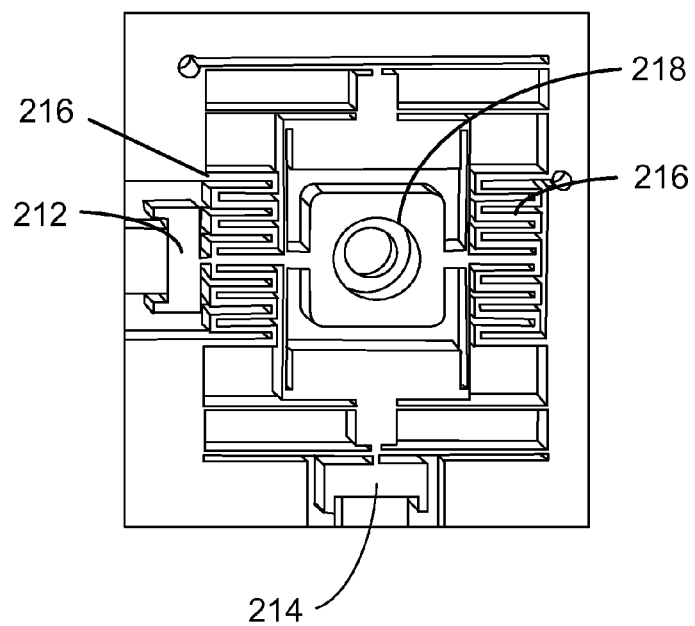
FIG. 2B schematically illustrates an enlarged view of a portion of the flexure apparatus of FIG. 2A

FIG. 2A schematically illustrates a flexure apparatus 202 according to one embodiment of the present invention. FIG. 2B schematically illustrates an enlarged view of a portion of the flexure apparatus of FIG. 2A. This apparatus is considered a parallel device in that the one actuator is not serially connected to another, as was the case in the compound parallelogram structure 104 in FIG. 1. The apparatus includes two actuators 232, 234, an image sensor (not shown), and a frame 204 including a torsion relief mechanism 222, mounting holes 224, and an assembly that includes a stiffening device 216, a mounting point for the image sensor 218, and a number of parallelogram structures (illustrated in more detail in FIG. 3). Each of these components is discussed herein.

In operation, flexure apparatus 202 is configured to move an image sensor that is attached to mounting point 218 to four positions (in this example) very rapidly. The image sensor captures an image an each of these four positions, and the four images are subsequently combined in a composite image. The four positions are defined by the four different combinations of each actuator being un-energized or energized. Two positions along the horizontal axis are defined by actuator 232, and two positions along the vertical axis are defined by actuator 234. With the four different combinations of each of the two actuators being un-energized or energized, the mounting point can be moved to four different locations, substantially forming a square or rectangular pattern. One example sequence of locations through which the mounting point can move is shown in 250 of FIG. 2C. An image may be captured at each vertex 1, 2, 3, and 4 (in this order) of pattern 250. The mounting point does not necessarily move in a counterclockwise direction, and in some embodiments the mounting point moves in a clockwise direction. In further embodiments, the mounting point may move diagonally across the center of the square or rectangle from one vertex to another. Another example sequence of locations though which the mounting point can move is shown in 251 of FIG. 2C. An image may be captured at each vertex 1, 2, 3, and 4 (in this order) of pattern 251. The mounting point moving diagonally across the center of the square or rectangle may minimize effects due to motion of the object being imaged. Other patterns of movement of the mounting point may be optimized for various purposes.

In other embodiments, flexure apparatus 202 is configured to move an image sensor that is attached to mounting point 218 to multiple positions (e.g., more than four positions in some cases, and less than four positions in other cases) very rapidly. For example, the flexure apparatus may be configured to move the image sensor to six different positions in some cases, nine different positions in other cases, and sixteen different positions in yet other cases. Nine positions may be defined by the nine different combinations of each actuator being un-energized, half-energized, and fully energized. Three positions along the horizontal axis are defined by actuator 232, and three positions along the vertical axis are defined by actuator 234. With the nine different combinations of each of the two actuators being un-energized, half-energized, or fully energized, the mounting point can be moved to nine different locations, substantially forming a square or rectangular pattern. Six positions may be defined by one actuator having two states and one actuator having three states. Sixteen positions may be defined by each actuator having four states. Thus, the number of positions of the mounting point may be defined by n×m, where n is the number of states of one actuator and m is the number of states of the other actuator.

The pattern of locations in which the mounting point moves may be the same as the pattern of locations described above. For example, with nine different locations of the mounting point (i.e., three along each edge and one in the center of a square or rectangle), the mounting point may be translated substantially along the perimeter of the square or rectangle, and then (in some cases) to the center location. Alternatively, the mounting point may be translated substantially along the diagonals of the square or rectangle. One example sequence of locations through which the mounting point may move is shown in 252 of FIG. 2C. An image may be captured at each position 1, 2, 3, 4, 5, 6, 7, 8, and 9 (in this order) of pattern 252.

The movement of the mounting point is very small. In some embodiments, the mounting point moves a fraction of the pixel to pixel spacing of the image sensor, and in further embodiments, the mounting point moves a fraction of 1/n, where n is a positive integer, of the pixel to pixel spacing (e.g., ½ of the pixel to pixel spacing, in some cases). The pixel to pixel spacing of an image sensor may be as small as a few micrometers. For example, in an embodiment where the pixel to pixel spacing is about 6 micrometers, the mounting point moves about 3 micrometers in the horizontal and vertical directions.

The frame 204 of the flexure apparatus may be fabricated from a number of different metals or other materials having the required mechanical properties. In some embodiments, the frame is fabricated from stainless steel. The features of the frame may be machined in the frame using a number of different machining techniques. In some embodiments, electric discharge machining (EDM) is used to machine the features in the frame. In some embodiments, the frame is cryogenically annealed before it is machined to remove any residual stresses in the frame. The frame needs to be designed so that it does not plastically deform while the apparatus is in operation. The frame is typically about 0.1 to 0.4 inches thick. In a specific embodiment, the frame is about 0.2 inches thick. The frame may be about 2.75 by 3.5 inches, in some embodiments.

For a micro-scanning system, a digital image sensor is attached to mounting point 218. Any number of digital image sensors may be used. In some embodiments, the image sensor includes a charge coupled device (CCD) device. In other embodiments, the image sensor includes a complementary metal-oxide-semiconductor (CMOS) device.

The mass of the material associated with mounting point 218 (including the stiffening device and the parallelogram structures), the image sensor, its related circuitry, and the hardware that connects image sensor to the mounting point, defines the mass of the system for the purposes of the system resonance, according to Equation 1. Thus, the mass of this assembly (i.e., the mounting point, the image sensor, its related circuitry, and the associated hardware) is minimized, in some embodiments. While some reduction in the mass of the image sensor, its circuitry, and connecting hardware can be realized, the reduction is limited to a relatively small percentage of the mass of the assembly. The assembly mass may also be minimized by attaching the image sensor to the mounting point with one small mechanical connection point. The flexure apparatus shown in 202 utilizes such a single point mounting method. The flexure apparatus shown in 202 also minimizes mass while still providing the necessary torsional stiffness. In some embodiments, the hole in the mounting point used to mount the image sensor and its circuitry is about 0.063 to 0.25 inches in diameter. In a specific embodiment, the hole is about 0.15 inches in diameter. In some embodiments, a small screw is used to attach the image sensor to mounting point 218 (i.e., there is one connection point for the image sensor to the mounting point). As explained herein, a low mass assembly is important in achieving the goal of low settling time of the assembly.

The actuators 232 and 234 may be any actuators that are configured to exert a force between the actuator's respective mounting points 212 and 213, 214 and 215. In a specific embodiment, piezoelectric actuators are used for the actuators. A piezoelectric actuator expands when an electric potential is applied across the actuator. Any number of different piezoelectric materials may be used for the piezoelectric actuators, including barium titanate, lead titanate, lead zirconate titanate, potassium niobate, lithium niobate, lithium tantalite, and sodium tungstate. In some embodiments, piezoelectric actuators from Thorlabs (Newton, N.J.) are used. In a specific embodiment, the piezoelectric actuators are about 0.8 inches long and about 0.15 by 0.15 inches in cross-section.

One challenge with various flexure apparatus is that of loading the actuators into the flexure apparatus. The tolerances associated with flexure apparatus and the actuators, along with the degree of preloading (i.e., preloading force) of the actuators, determines how much the mounting point (along with the attached actuator mounting points 212 and 214) must be moved in order to load the actuators. If a simple parallelogram structure (e.g., as shown in FIG. 1) is used for the flexure apparatus, and the flexure apparatus is designed to avoid maximum stresses, the stiffness is fixed and the only degree of freedom available to adjust the frequency of resonance is the mass of the assembly (i.e., the stiffness of the system is set). As explained above, the mass of the assembly may be reduced somewhat, but there is generally little control over the mass of the assembly. This means that simple parallelogram structures provide very little flexibility with regard to adjusting the frequency of resonance of the assembly.

With the flexure apparatus shown in FIG. 2A, however, the parallelogram structures and stiffening device 216 are configured such that mounting point 218 may be moved about 0.002 to 0.012 inches horizontally and vertically to load the actuators. In some embodiments, mounting point 218 may be moved about 0.005 to 0.006 inches to load the actuators. The stiffening device 216 may be configured to accommodate the stiffness of the assembly (i.e., the resistance of the mounting point to motion), both when loading the actuators and when the flexure apparatus is in operation such that the assembly achieves desired resonant frequency goals. The stiffening device sets the stiffness of the assembly both along the horizontal direction of motion and the vertical direction of motion.

Establishing the stiffness of the assembly defines the resonant frequencies of the assembly. In embodiments disclosed herein, the resonant frequencies of the assembly are established at a value substantially above the frequency content of the drive signal for the flexure apparatus actuators. When, for example, an image is captured about every 20 milliseconds, the frequency content of the actuator drive signal would need to be about 90 Hertz (Hz). This assumes that about 20% of the capture time is allowed for assembly movement and settle, or about 4 milliseconds. Assuming a first order system, the required frequency content for the drive signal would need to be approximately 0.35/4 milliseconds, or 87.5 Hz. In some embodiments, the stiffening device is configured such that the frequency of resonance of the assembly is above about 500 Hz. In further embodiments, the stiffening device is configured such that the frequency of resonance of the assembly is about 700 Hz to 1000 Hz or above about 700 Hz to 1000 Hz.

Figure 2C:
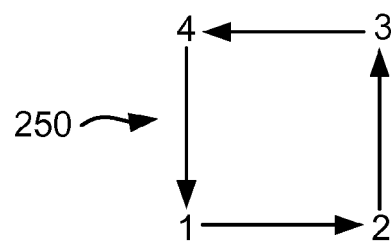
FIG. 2C illustrates examples of sequences of locations that the flexure apparatus of FIG. 2A may translate the mounting point.
Figure 2C:
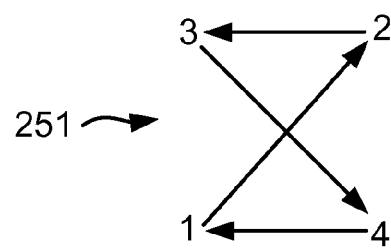
Figure 2C:
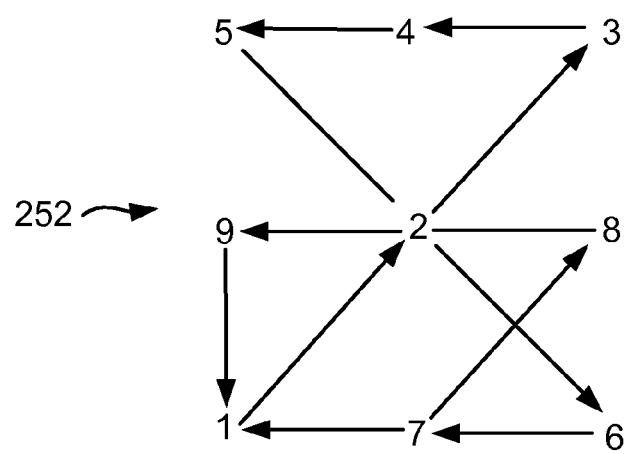
Figure 2D:
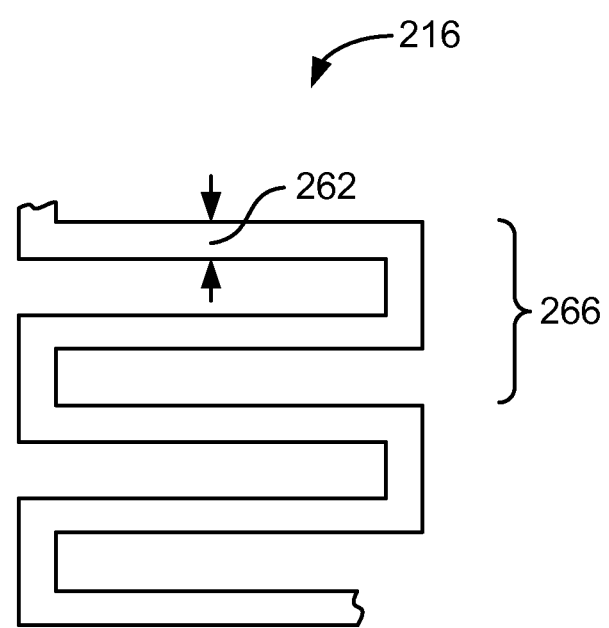
FIG. 2D schematically illustrates an enlarged view of a portion of the flexure apparatus of FIG. 2A.

An enlarged view of a portion of a stiffening device 216 is shown in FIG. 2D. One way in which the stiffness of the assembly may be increased is by increasing the thickness of the stiffening device coil; i.e., increasing thickness 262. The thickness of this coil may be uniform throughout the entire stiffening device, or certain portions may be thicker than others in order to establish the desired stiffness of the assembly. Another way in which the stiffness of the assembly may be increased is by reducing the number of sections 266 of the stiffening device coil. With fewer sections 266 of the stiffening device coil in the stiffening device, the stiffness of the assembly will increase. Thus, with such an flexure apparatus, the stiffness of the assembly may be established with the geometry of the stiffening device, yet the combination of the parallelogram structures and the stiffening device still allow for relatively large displacements of the mounting point during the loading of the actuators. Without such a stiffening device that allows for large displacements of the mounting point during the loading of the actuators, the frame would likely plastically deform while loading the actuators, making the flexure apparatus unusable.

Figure 3:
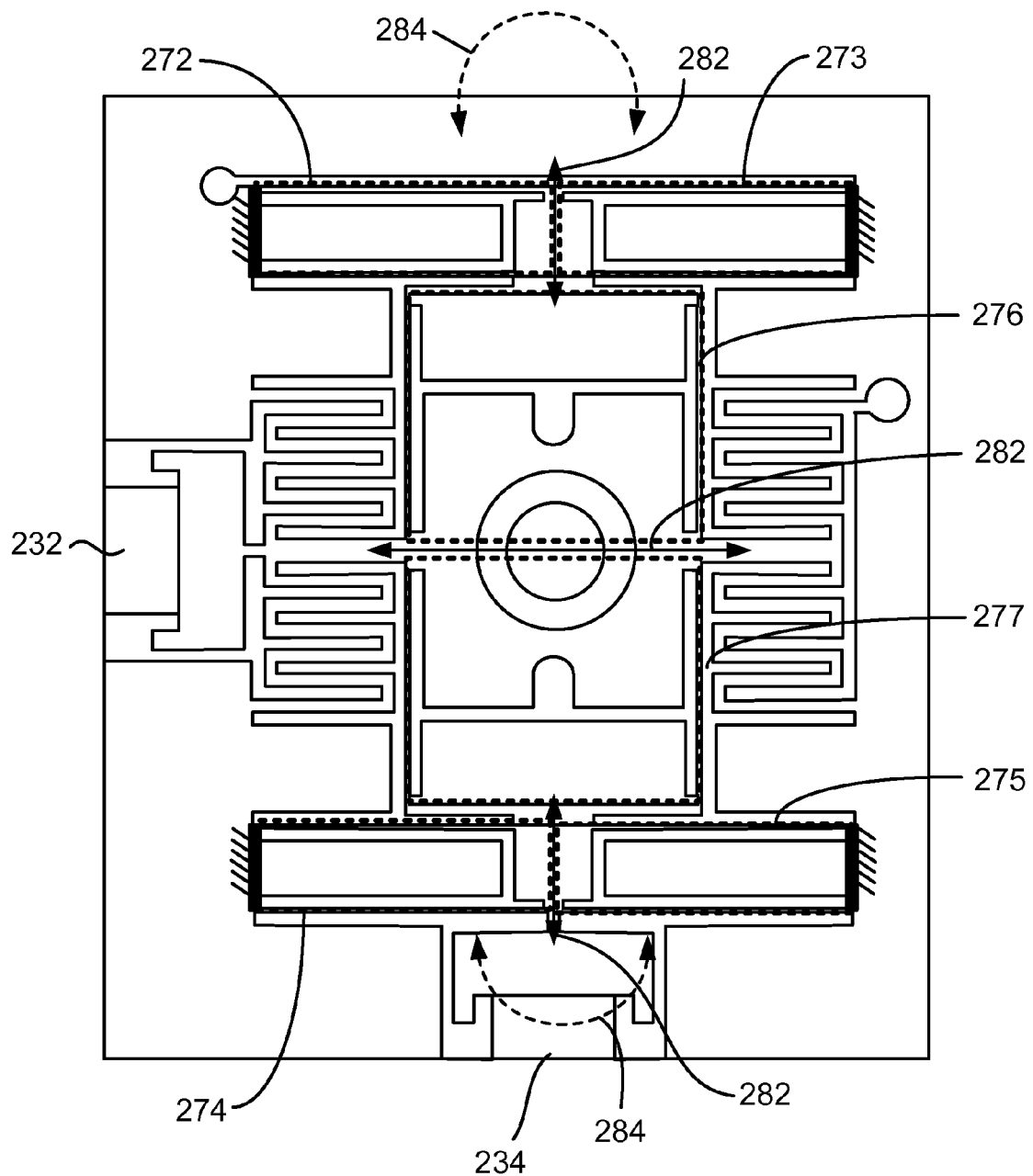
FIG. 3 schematically illustrates a flexure apparatus as shown in FIG. 2A, highlighting the parallelogram structures built into the assembly.

FIG. 3 schematically illustrates flexure apparatus 202 as shown in FIG. 2A, highlighting the parallelogram structures that are part of the assembly. The assembly includes parallelogram structures 272, 273, 274, 275, 276, and 277, indicated by the white dashed rectangles. The arrows 282 illustrate the directions of motion through which the mounting point is allowed to move, as defined by the parallelogram structures. The parallelogram structures allow the mounting point to move in a first direction and a second direction, the second direction being substantially orthogonal to the first direction. The dashed arrows 284 indicate the rotational directions which the parallelogram structures oppose. As noted herein, the parallelogram structures prevent the image sensor from rotating in the plane of the frame.

Another design goal for an flexure apparatus is low cost and minimal impact to the complexity of the rest of the micro-scanning system. To these ends, a related design goal for the apparatus is to avoid the need for run-time calibration. In many micro-scanning systems, a run-time calibration is needed every time the system acquires a set of images for a fingerprint image or each time power is applied to the system. This run-time calibration is used to determine the different positions from which images will be captured (e.g., image 2 is captured with the image sensor displaced horizontally 3 micrometers from image 1). Accurately knowing the relative positions from which each image is captured is necessary to generate a composite image from the separate images using micro-scanning techniques. Avoiding run-time calibration avoids the cost associated with optical alignment targets, and the overhead in time and cost of the required software. The delay associated with each run-time calibration, which may degrade the system response time, can be avoided as well. If a one-time factory calibration can be performed, with no further run-time calibrations needed, the micro-scanning system can be greatly simplified.

Flexure apparatus 202, with a stiffening device and parallelogram structures, is configured to be used with a one-time factory calibration. In the one-time factory calibration, the distance that actuator 232 horizontally translates mounting point 218 in response to an input signal applied to the actuator is determined. For a piezoelectric actuator, the input signal is a specific potential applied across the piezoelectric actuator. Similarly, the distance that actuator 234 vertically translates mounting point 218 in response to an input signal is determined. These distances need to be accurately known in order to generate a composite image from the images captured at each of the four positions defined by the actuators. Due to the configuration of the parallelogram structures and stiffening device of flexure apparatus 202, these two distances (i.e., amount of horizontal translation and amount of vertical translation) do not substantially change over the operational lifetime of the flexure apparatus or with the ambient conditions (e.g., temperature or humidity). Thus, run-time calibrations do not need to be performed in order to determine the different positions in which the actuators will translate the image sensor.

To avoid exciting resonances of the assembly when the flexure apparatus is in operation, in some embodiments, the frequency content of the waveform supplied to actuate the actuators (i.e., the drive signal) is kept low by applying a filter to the waveform. This waveform is supplied by a control unit, in some embodiments. When, for example, the flexure apparatus is operating at about 50 positions per second, the waveform supplied to the actuators would include frequencies up to about 90 Hz. The waveform may be filtered by the control unit with a low-pass filter to remove higher frequencies from the waveform. With the resonant frequencies of the assembly (i.e., above about 500 Hz, or about 700 to 1000 Hz, in some cases) being higher than the frequency of the apparatus operation, removing these higher frequencies from the drive signal waveform avoids exciting higher frequency resonances. In some embodiments, a phase linear filter is used. The phase linear filter is typically a low-pass filter. Any number of different low-pass filters may be used. In some embodiments, a Gaussian, Bessel, Bessel-Thomson, or raised cosine filter is used. In some embodiments, a low-pass filter with a frequency cut-off of about 200 Hz is used. In other embodiment, a low-pass filter with a frequency cut-off of about 225 Hz, or in further embodiments, about 240 Hz, is used. Minimizing the frequency content of the waveform used to drive the actuators also minimizes the acoustic noise that the flexure apparatus generates while in operation, which is also desirable.

Frame 204 of flexure apparatus 202 in FIG. 2A also includes mounting holes 224 that are part of the mounting region that is used to mount the flexure apparatus in a fingerprint scanner or other imaging system. A torsion relief mechanism 222, which takes the form of a cut in the frame in some embodiments, separates the mounting region of the frame from the assembly. In the absence of such a torsion relief mechanism, if a moment is induced in the frame from the mounting region (e.g., by the mounting region not being mounted on a flat surface or temperature induced moments), the stiffness of the connection between the mounting points and the assembly would transfer the moment, potentially deforming the assembly. This might hinder the performance of the flexure apparatus by changing its displacement and potentially requiring run-time calibration before operation, for example. By including a torsion relief mechanism, however, any moment induced twist experienced by the mounting region of the frame is effectively blocked from the assembly by the torsion relief mechanism (i.e., the torsion relief mechanism substantially isolates the assembly from stresses and moments in the mounting region). The torsion relief mechanism helps to allow the assembly to remain flat and independent of stresses and moments in the mounting region of the frame. Insensitivity of the assembly to mounting region moments also allows the assembly to behave in a substantially consistent fashion regardless of the rest of the flexure apparatus, also helping to obviate the need for run-time calibration.

In summary, embodiments of the disclosed flexure apparatus incorporate a stiffening device which substantially establishes the assembly stiffness and is independent from the parallelogram structures. The stiffening device significantly reduces the interdependence of the assembly mass and stiffness, allowing the assembly to be tuned for minimum settle time. More specifically, the flexure apparatus described herein includes a novel geometry that separates the assembly stiffness from the assembly mass, allowing the assembly to be tuned for minimum settle time. This in turn allows low-cost, passive open-loop drive circuitry to be used. An appropriate filter for the drive signal for the actuators may also be incorporated into the micro-scanning system. A torsion relief mechanism may be included in some embodiments of the flexure apparatus, allowing the assembly to remain planar, independent of the mounting conditions. This allows the mounting point travel to remain consistent over various conditions. These features may be combined to create a low-cost, high performance flexure apparatus for a micro-scanning system.

Method of Operation

As explained herein, micro-scanning consists of capturing multiple images of a scene from multiple vantage points. The flexure apparatus described above is configured to capture such multiple images at a rapid rate. These images are used to generate a composite image, the composite image having a higher resolution than the individual images.

Figure 4:
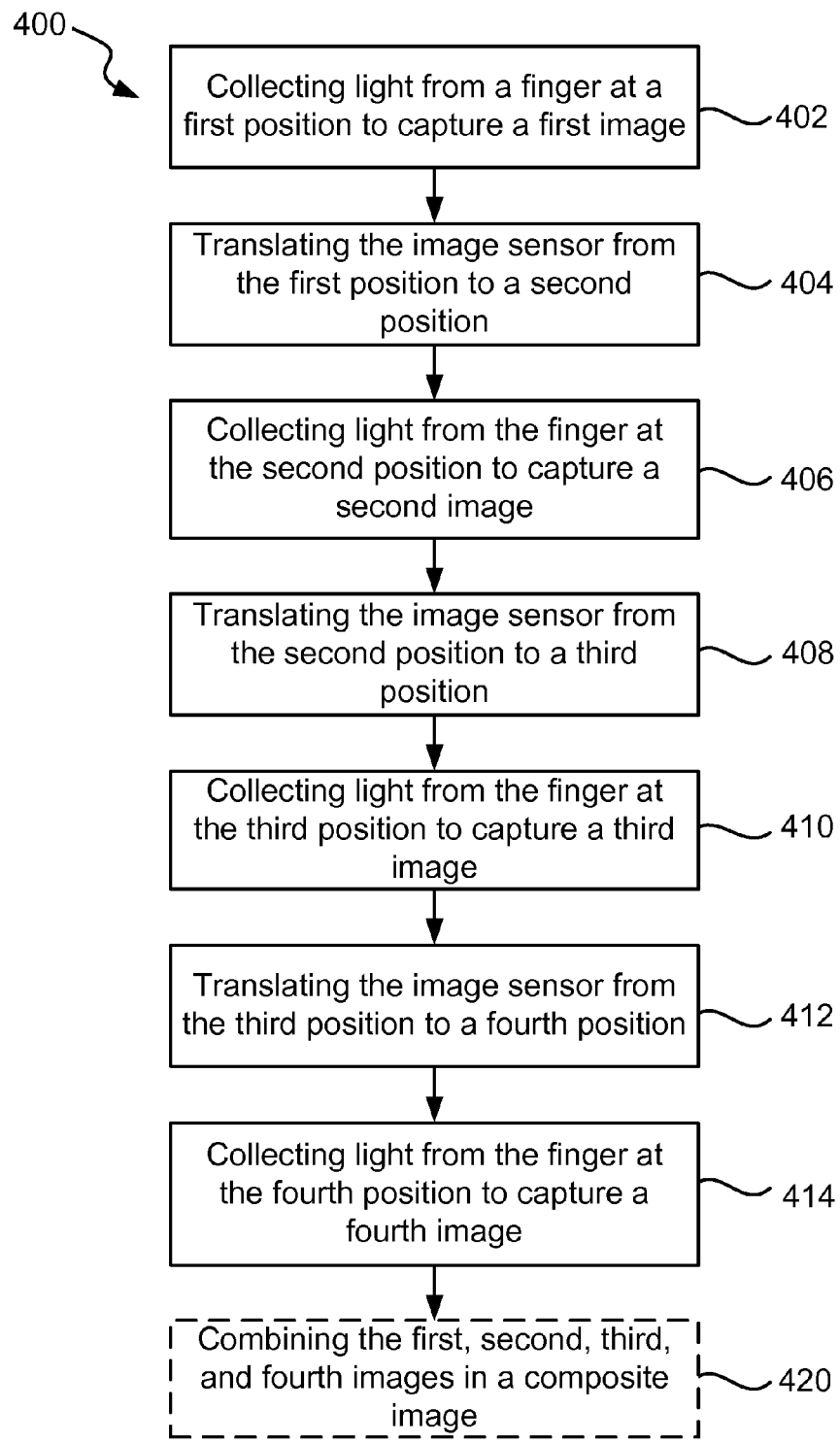
FIG. 4 is a flowchart for a micro-scanning method according to one embodiment of the present invention.

FIG. 4 is a flowchart for a micro-scanning method according to one embodiment of the present invention. In 402, light is collected from a finger with an image sensor at a first position to capture a first image. This image data is transferred to a storage system. For example, the storage system may be a memory device (e.g., a hard drive or a RAM device) that is part of a computer system.

In 404, the image sensor is translated from the first position to a second position. Before a second image is captured, the assembly that is configured to hold the image sensor apparatus needs to be substantially stationary (i.e., the image sensor needs to be settled and not vibrating). Then, in 406, light is collected from the finger with the image sensor at the second position to capture a second image. The second image is captured within less than about 20 milliseconds of capturing the first image. Thus, within this about 20 milliseconds, translation of the image sensor to the second position from the first position and capture of the second image needs to occur. Acquisition of light for the second image and transferring the data to the storage system may consume a large portion of this about 20 milliseconds, leaving a small amount of time for the image sensor to translate and settle. The time given for the image sensor to translate and settle decreases as the image acquisition rate increases (e.g., when the second image is captured within less than about 10 milliseconds of capturing the first image). Embodiments of the flexure apparatus described herein are configured such that settle time is minimized by not exciting a resonant frequency of the assembly. In 406, light is collected from a finger with the image sensor at the second position to capture a second image, which is subsequently transferred to the storage system.

In 408 though 414, operation of the flexure apparatus continues and a third and fourth image are captured and subsequently transferred to the storage system. In 408, the image sensor is translated from the second position to the third position. The translation from the second position to the third position is substantially orthogonal to the translation from the first position to the second position (according to pattern 250 in FIG. 2C). In 410, light is collected from the finger with the image sensor at the third position to capture a third image within less than about 20 milliseconds of capturing the second image. In 412, the image sensor is translated from the third position to a fourth position. The translation from the third position to the fourth position is substantially parallel to the translation from the first position to the second position (according to pattern 250 in FIG. 2C). In 414, light is collected from the finger with the image sensor at the fourth position to capture a fourth image within less than about 20 milliseconds of capturing the third image. The first, second, third, and fourth images may be captured at positions 1, 2, 3, and 4 (in this order) of pattern 250 in FIG. 2C, in some embodiments.

To repeat the cycle, the image sensor is translated from the fourth position to the first position. The translation from the fourth position to the first position is substantially parallel to the translation from the second position to the third position (according to pattern 250 in FIG. 2C). Light is then collected from the finger with the image sensor at the first position to capture another first image within less than about 20 milliseconds of capturing the fourth image.

In other embodiments, the image sensor is translated diagonally across the center of the square or rectangle from one vertex to another (e.g., moving to the vertexes in the order of 1, 2, 3, and 4 of pattern 251 in FIG. 2C). In 402, light is collected from a finger with an image sensor at a first position to capture a first image. In 404, the image sensor is translated from the first position to a second position. The translation from the first position to the second position is substantially along a first diagonal of a substantially rectangular set of four vertices. Then, in 406, light is collected from the finger with the image sensor at the second position to capture a second image. The second image is captured within less than about 20 milliseconds of capturing the first image. In 408, the image sensor is translated from the second position to the third position. The translation from the second position to the third position is substantially along a first side of the substantially rectangular set of four vertices. In 410, light is collected from the finger with the image sensor at the third position to capture a third image within less than about 20 milliseconds of capturing the second image. In 412, the image sensor is translated from the third position to a fourth position. The translation from the third position to the fourth position is substantially along a second diagonal of the substantially rectangular set of four vertices. In 414, light is collected from the finger with the image sensor at the fourth position to capture a fourth image within less than about 20 milliseconds of capturing the third image.

To repeat the cycle, the image sensor is translated from the fourth position to the first position. The translation from the fourth position to the first position is substantially along a second side of the substantially rectangular set of four vertices and is substantially parallel to the translation from the second position to the third position. Light is then collected from the finger with the image sensor at the first position to capture another first image within less than about 20 milliseconds of capturing the fourth image.

The cycle (i.e., capturing the first, second, third, and fourth images) is repeated until enough images are captured such that enough composite images can be generated such that a slap or a rolled fingerprint image can be generated. When generating a slap fingerprint image or a rolled fingerprint image, each set of first, second, third, and fourth images may be combined in a composite image 420. The composite image has a higher resolution than the first, second, third, and fourth images. In some embodiments, the resolution of each of the first, second, third, and fourth images is about 500 ppi. In some embodiments, the resolution of the composite image is about 1000 ppi. In some embodiments, the resolution of the composite image is higher than about 1000 ppi (e.g., at least about 1000 ppi). The higher resolution composite images are then used to generate a slap fingerprint image or a rolled fingerprint image.

In further embodiments, the flexure apparatus is configured to capture more than 4 images. For example, in some embodiments, the flexure apparatus is configured to capture nine images, and in further embodiments, sixteen images. A micro-scanning method using such a flexure apparatus may be used to generate a composite image with an even greater resolution than can be generated with four images. Alternatively, a micro-scanning method using such a flexure apparatus may employ an image sensor with a lower resolution and be used to generate a composite image with about the same resolution that can be generated with four images.

A number of embodiments of the invention have been described. Nevertheless, it will be understood that various modifications may be made without departing from the spirit and scope of the invention.

What is claimed is:

1. An apparatus configured to micro-scan a fingerprint image, comprising:
   an image sensor configured to capture fingerprint images;
   a first actuator;
   a second actuator;
   an assembly, the assembly including:
     a mounting point configured to hold the image sensor,
     a first mounting region configured to hold the first actuator,
     a second mounting region configured to hold the second actuator, and
     a stiffening device coupled to the mounting point, the first actuator, and the second actuator, wherein the stiffening device has a geometry configured to establish the resistance of the mounting point to a force induced by the first actuator configured to produce a linear translation of the mounting point, and to establish the resistance of the mounting point to a force induced by the second actuator configured to produce a linear translation of the mounting point, wherein the linear translation produced by the second actuator is substantially orthogonal to the linear translation produced by the first actuator and wherein the stiffening device is configured to establish a resonant frequency of the assembly; and a control unit configured to drive the first actuator and the second actuator with a drive signal having a selected operational frequency wherein the resonant frequency of the assembly is greater than the selected operational frequency in order to minimize a settle time of the assembly.

2. The apparatus of claim 1, wherein the resistance of the stiffening device to the force induced by the first actuator or the force induced by the second actuator results in high resonant frequences of the assembly.

3. The apparatus of claim 2, wherein the resonant frequencies of the assembly are greater than about 500 Hertz.

4. The apparatus of claim 1, wherein the first actuator and the second actuator include a piezoelectric device.

5. The apparatus of claim 1, wherein a pattern in which the mounting point is translated is substantially rectangular.

6. The apparatus of claim 5, wherein the image sensor is configured to capture a fingerprint image at each vertex of the substantially rectangular pattern.

7. The apparatus of claim 1, wherein the mounting point is translated to four vertices of a substantially rectangular set, wherein at least one translation of the mounting point is substantially along a diagonal of the substantially rectangular set of four vertices.

8. The apparatus of claim 7, wherein the image sensor is configured to capture a fingerprint image at each of the four vertices.

9. The apparatus of claim 8, wherein each one of the four fingerprint images captured at each vertex are configured to be combined in a composite image, wherein the composite image has a higher resolution than a resolution of the each of the fingerprint images.

10. The apparatus of claim 9, wherein the composite image is a rolled fingerprint image.

11. The apparatus of claim 1, wherein the drive signal includes a frequency of about 50 Hertz, wherein the control unit is configured to pass the drive signal though a low-pass filter configured to remove frequencies from the drive signal above about 200 Hertz.

12. The apparatus of claim 1, wherein the image sensor is a CMOS sensor or a CCD sensor.

13. The apparatus of claim 1, wherein the image sensor is configured to capture an image about every 20 milliseconds.

14. The apparatus of claim 1, further comprising:
a third mounting region configured to mount the apparatus to an object; and
a relief mechanism between the third mounting region and the assembly, wherein the relief mechanism is configured to substantially isolate the assembly from stresses and moments in the third mounting region.

15. The apparatus of claim 1, wherein a mass defined by a mass of the assembly, a mass of the image sensor, and a mass of a circuit board associated with the image sensor, and a mass of the mounting hardware associated with the image sensor is minimized.

16. A system configured to micro-scan a fingerprint image, comprising:
an image sensor configured to capture fingerprint images;
a first actuator;
a second actuator;
an assembly, the assembly including:
a mounting point configured to hold the image sensor,
a first mounting region configured to hold the first actuator,
a second mounting region configured to hold the second actuator,
a stiffening device coupled to the mounting point, the first actuator, and the second actuator, the stiffening device configured to establish a resonant frequency of the assembly, and
a plurality of parallelogram structures, the plurality of parallelogram structures configured to define a first linear translation of the mounting point due to a force induced by the first actuator and a second linear translation of the mounting point due to a force induced by the second actuator, wherein the first linear translation is substantially orthogonal to the second linear translation, and wherein the plurality of parallelogram structures substantially prevent rotation of the mounting point in the plane of the assembly; and
a control unit configured to drive the first actuator and the second actuator with a drive signal at a selected operational frequency wherein the resonant frequency of the assembly is greater than the selected operational frequency in order to minimize a settle time of the assembly.

17. The system of claim 16, wherein the plurality of parallelogram structures of the assembly consists of six parallelogram structures.

18. A method of generating a fingerprint image, comprising:
collecting light from a finger with an image sensor at a first position to capture a first image;
translating the image sensor from the first position to a second position, wherein the translation from the first position to the second position is substantially along a first diagonal of a substantially rectangular set of four vertices;
collecting light from the finger with the image sensor at the second position to capture a second image, wherein the second image is captured within less than about 20 milliseconds of capturing the first image;
translating the image sensor from the second position to a third position, wherein the translation from the second position to the third position is substantially along a first side of the substantially rectangular set of four vertices;
collecting light from the finger with the image sensor at the third position to capture a third image, wherein the third image is captured within less than about 20 milliseconds of capturing the second image;
translating the image sensor from the third position to a fourth position, wherein the translation from the third position to the fourth position is substantially along a second diagonal of the substantially rectangular set of four vertices;
collecting light from the finger with the image sensor at the forth position to capture a fourth image, wherein the fourth image is captured within less than about 20 milliseconds of capturing the third image, wherein the first, second, third, and fourth images may be combined in a composite image, and wherein the composite image has a higher resolution than a resolution of the first, second, third, and fourth images; and wherein translating the image sensor between the first, second, third, and fourth positions is done at a frequency below a resonant frequency of an assembly configured to hold the image sensor, thereby not exciting the resonant frequency of the assembly in order to minimize a settle time of the assembly.

19. The method of claim 18, wherein the resolution of the composite image is about 1000 pixels per inch.

20. The method of claim 18, further including:

translating the image sensor from the fourth position to the first position, wherein the translation from the fourth position to the first position is substantially along a second side of the substantially rectangular set of four vertices and is substantially parallel to the translation from the second position to the third position.

21. The method of claim 20, further including:

repeating capturing images at the first, second, third, and fourth positions until a number of images are captured sufficient to generate a number of composite images, wherein the number of composite images is sufficient to generate a rolled fingerprint image.

22. The method of claim 18, wherein the second image is captured within less than about 10 milliseconds of capturing the first image, wherein the third image is captured within less than about 10 milliseconds of capturing the second image, and wherein the fourth image is captured within less than about 10 milliseconds of capturing the third image.

23. A method of generating a fingerprint image, comprising:

collecting light from a finger with an image sensor at a first position to capture a first image;

translating the image sensor from the first position to a second position;

collecting light from the finger with the image sensor at the second position to capture a second image, wherein the second image is captured within less than about 20 milliseconds of capturing the first image;

translating the image sensor from the second position to a third position, wherein the translation from the second position to the third position is substantially orthogonal to the translation from the first position to the second position;

collecting light from the finger with the image sensor at the third position to capture a third image, wherein the third image is captured within less than about 20 milliseconds of capturing the second image;

translating the image sensor from the third position to a fourth position, wherein the translation from the third position to the fourth position is substantially parallel to the translation from the first position to the second position;

collecting light from the finger with the image sensor at the fourth position to capture a fourth image, wherein the fourth image is captured within less than about 20 milliseconds of capturing the third image, wherein the first, second, third, and fourth images may be combined in a composite image, and wherein the composite image has a higher resolution than a resolution of the first, second, third, and fourth images; and wherein translating the image sensor between the first, second, third, and fourth positions is done at a frequency below a resonant frequency of an assembly configured to hold the image sensor, thereby not exciting the resonant frequency of the assembly in order to minimize a settle time of the assembly.

24. The method of claim 23, further including:

translating the image sensor from the fourth position to the first position, wherein the translation from the fourth position to the first position is substantially parallel to the translation from the second position to the third position.

25. The method of claim 24, further including:

repeating capturing images at the first, second, third, and fourth positions until a number of images are captured sufficient to generate a number of composite images, wherein the number of composite images is sufficient to generate a rolled fingerprint image.

26. A method of generating a rolled fingerprint image, comprising:

a) collecting light from a rolling finger with an image sensor at one position to capture an image;

b) translating the image sensor to a new position;

c) collecting light from the rolling finger with the image sensor at the new position to capture another image;

d) repeating steps b) and c), wherein a current new position after each repetition of steps b) and c) is located a distance from a previous new position that is a fraction of the pixel to pixel spacing of the image sensor, wherein steps b) and c) are repeated to capture a plurality of images, wherein the plurality of images may be combined in a composite image, and wherein the composite image has a higher resolution than a resolution of each of the images of the plurality of images; and e) wherein translating the image sensor to a new position is done at a frequency below a resonant frequency of an assembly configured to hold the image sensor thereby not exciting the resonant frequency of the assembly in order to minimize the settle time of the assembly.

\* \* \* \* \*